United States Patent
Gammons et al.

(10) Patent No.: US 10,841,472 B2
(45) Date of Patent: Nov. 17, 2020

(54) LIGHTING SYSTEM AND CONTROL THEREOF

(71) Applicant: Rotolight Limited, London (GB)

(72) Inventors: Roderick Allen Gammons, Staines Upon Thames (GB); Jan Christoph Winter, Berlin (DE); Andrew Francis, Witham (GB); Roderick Aaron Gammons, Winkfield (GB)

(73) Assignee: Rotolight Limited, Iver Heath (GB)

( * ) Notice: Subject to any disclaimer, the term of this patent is extended or adjusted under 35 U.S.C. 154(b) by 0 days.

(21) Appl. No.: 15/481,463

(22) Filed: Apr. 7, 2017

(65) Prior Publication Data
US 2017/0374250 A1 Dec. 28, 2017

Related U.S. Application Data

(60) Provisional application No. 62/319,811, filed on Apr. 8, 2016.

(30) Foreign Application Priority Data

Apr. 20, 2016 (GB) .................................. 1606908.0

(51) Int. Cl.
*G03B 15/02* (2006.01)
*H04N 5/232* (2006.01)
(Continued)

(52) U.S. Cl.
CPC ........... *H04N 5/2256* (2013.01); *G03B 7/097* (2013.01); *G03B 7/16* (2013.01); *G03B 15/02* (2013.01);
(Continued)

(58) Field of Classification Search
CPC ............... H04N 5/2256; H04N 5/2351; H04N 5/23203; H05B 37/0245; H05B 37/0227;
(Continued)

(56) References Cited

U.S. PATENT DOCUMENTS 6,560,412 B2 * 5/2003 Iwasaki .................. G03B 15/05
396/157
8,614,766 B1 * 12/2013 Clark ................... H04N 5/2256
348/370
(Continued)

FOREIGN PATENT DOCUMENTS

| DE | 1797079 | 9/1971 |
|---|---|---|
| DE | 3107439 | 9/1982 |

(Continued)

OTHER PUBLICATIONS

Communication Pursuant to Rule 114(2) EPC [Third Party Observation] Dated Jul. 16, 2019 From the European Patent Office Re. Application No. 17165574.9. (4 Pages).
(Continued)

*Primary Examiner* — Shahbaz Nazrul

(57) ABSTRACT

The present invention relates to a method for controlling a lighting device, the method comprising: receiving data relating to settings on a camera; determining an illuminance for at least one lighting device in dependence on said data; and modifying the illuminance of a lighting device to said determined illuminance.

15 Claims, 6 Drawing Sheets

(51) Int. Cl.
*H04N 5/235* (2006.01)
*H04N 5/225* (2006.01)
*G03B 7/16* (2014.01)
*H05B 45/10* (2020.01)
*H05B 47/19* (2020.01)
*H05B 47/105* (2020.01)
*G03B 7/097* (2006.01)
*G06K 9/20* (2006.01)

(52) U.S. Cl.
CPC ....... *H04N 5/2351* (2013.01); *H04N 5/23203* (2013.01); *H05B 45/10* (2020.01); *H05B 47/105* (2020.01); *H05B 47/19* (2020.01); *G06K 9/2027* (2013.01)

(58) Field of Classification Search
CPC ............ H05B 37/0272; H05B 33/0845; H05B 37/029; H05B 37/02; H05B 33/0842; H05B 45/10; H05B 47/19; H05B 47/105; H05B 45/00; H05B 47/10; H05B 47/155; G03B 7/097; G03B 15/02; G03B 7/16; G06K 9/2027
See application file for complete search history.

(56) References Cited

U.S. PATENT DOCUMENTS

| | | | |
|---|---|---|---|
| 2002/0048457 | A1 | 4/2002 | Matsui |
| 2004/0042774 | A1 | 3/2004 | Takeuchi |
| 2005/0275730 | A1* | 12/2005 | Hayaishi ............ H04N 1/6086 348/222.1 |
| 2006/0165399 | A1 | 7/2006 | Feng et al. |
| 2008/0151052 | A1 | 6/2008 | Erel et al. |
| 2009/0208198 | A1 | 8/2009 | Khuntia |
| 2010/0124041 | A1* | 5/2010 | Druchinin ............ G03B 11/00 362/16 |
| 2010/0189429 | A1 | 7/2010 | Butterworth |
| 2010/0254692 | A1* | 10/2010 | Kurt .................... G03B 15/03 396/155 |
| 2010/0317398 | A1* | 12/2010 | Thorn .................. G03B 15/02 455/556.1 |
| 2012/0033959 | A1 | 2/2012 | King |
| 2012/0140088 | A1* | 6/2012 | Clark .................... G03B 15/05 348/211.2 |
| 2014/0293091 | A1* | 10/2014 | Rhoads .................. G01J 3/513 348/234 |
| 2015/0229820 | A1 | 8/2015 | Chu |
| 2016/0191778 | A1* | 6/2016 | Chou .................. H04N 5/2354 348/371 |

FOREIGN PATENT DOCUMENTS

| | | |
|---|---|---|
| DE | 3436685 | 4/1986 |
| DE | 3603382 | 8/1987 |
| DE | 3819612 | 12/1989 |
| EP | 2128693 | 12/2009 |
| EP | 2387230 | 11/2011 |
| EP | 2490439 | 8/2012 |
| EP | 2512121 | 10/2012 |
| GB | 2253718 | 9/1992 |
| GB | 2494537 | 3/2013 |
| WO | WO 2011/024193 | 3/2011 |

OTHER PUBLICATIONS

European Search Report and the European Search Opinion dated Jul. 26, 2017 From the European Patent Office Re. Application No. 17165574.9. (9 Pages).

Patents Act 1977 Combined Search and Examination Report Under Sections 17 & 18(3) dated Jun. 23, 2016 From the Intellectual Property Office of the United Kingdom of Great Britain Re. Application No. GB1606908.0. (9 Pages).

Godox "XI TTL Wireless Flash Trigger for Cannon", Godox Photo Equipment, User Manual, p. 23-50, Jun. 9, 2017.

Wikipedia "Through-the-Lens Metering", Wikipedia, The Free Encyclopedia, 3 P., May 7, 2019.

Communication Pursuant to Article 94(3) EPC dated Oct. 28, 2019 From the European Patent Office Re. Application No. 17165574.9. (5 Pages).

Patents Act 1977: Examination Report under Section 18(3) dated Aug. 20, 2019 From the Intellectual Property Office fo the United Kingdom of Great Britain Re. Application No. .1606908.0 (3 Pages).

* cited by examiner

LIGHTING SYSTEM AND CONTROL THEREOF

RELATED APPLICATIONS

This application claims the benefit of priority of U.S. Provisional Patent Application No. 62/319,811 filed on Apr. 8, 2016, and United Kingdom Patent Application No. 1606908.0 filed on Apr. 20, 2016. The contents of the above applications are incorporated herein by reference in their entirety.

FIELD AND BACKGROUND OF INVENTION

This invention relates to a lighting system, and the control of a lighting system.

Photographers are able to adjust settings on their camera so as to achieve a desired exposure, depth of field, or other characteristic of the resulting photograph or film. The settings include aperture size (f-stop), shutter speed, and ISO (International Standards Organisation)/ASA (American Standards Association) film speed. However, the amount of light incident on the subject affects the resulting image or film, and may render the desired camera settings unsuitable. In addition, if 'auto' exposure is used on a camera, the desired composition of the photo will be automatically adjusted (i.e. depth of field, exposure time, etc.), and even with a shutter or aperture priority there will be a trade off between either the depth of field (aperture) or exposure duration resulting in a compromised composition.

An improved solution is desired.

SUMMARY OF THE INVENTION

According to one aspect of the invention there is provided a method for controlling a lighting device, the method comprising: receiving data relating to settings on a camera; determining an illuminance for at least one lighting device in dependence on said data; and modifying the illuminance of a lighting device to said determined illuminance. Preferably, the determining comprises calibrating the illuminance based on a known illuminance value for a known distance for said lighting device.

According to another aspect of the invention, there is provided a method for controlling a lighting device, the method comprising: receiving data relating to settings on a camera; determining the brightness of a lighting device; determining an appropriate aperture size for said camera in dependence on said data and said brightness.

According to a further aspect of the present invention there is provided a lighting device which is able to calculate and display F-Stop (aperture) for a subject based on the current light output (brightness) at a given distance, based on the ISO/ASA film speed settings of a camera, and the shutter speed.

Preferably, the brightness is based on the ISO/ASA film speed settings of a camera.

Preferably, as the brightness of the light is adjusted, an accurate display of the correct aperture (F-stop) is shown, which is calculated from the remaining camera exposure settings (exposure speed/ISO/ASA/distance from the light to the subject) and data about the output of the light, for example determined from a "look up table" stored within the light or light controller itself.

Preferably, as the photographer has composed a picture with specific depth of field (Aperture/F-Stop) and exposure time and sensitivity (ISO/ASA), the brightness of the light can be quickly and accurately adjusted to match the camera settings, as the light brightness setting is displayed as an aperture (F-stop), which is calculated from the remaining camera exposure settings (exposure speed/ISO/ASA/distance from the light to the subject) and data about the output of the light Preferably, whichever exposure parameter (ISO/exposure/distance) is dynamically changing during the photo session, that such parameter will be 'bookmarked' to the most recently edited parameter, and instantly available to be edited by the user with a single click, to save time and expediency.

Preferably the calculated aperture F-Stop value includes modified calculations that take into consideration subject contrast and Light output/beam angle, i.e. that the effect of skin tone contrast, and measured light output and beam angle are also included into the final calculated Aperture value Preferably if multiple lights are used an application (app) may be used to quickly re-calculate the aperture settings from the group of lights.

Preferably the data relating to settings on a camera comprises exposure settings.

Preferably, the method further comprises determining a distance to a subject and determining said illuminance for at least one lighting device, or camera aperture size, in dependence on said distance. Preferably, determining a distance to a subject comprises receiving data relating to the focus of a camera. Preferably, determining a distance to a subject comprises illuminating the subject with a distance measuring light beam.

Preferably said calibrating comprises querying a look-up table relating to said lighting device. Preferably, the look-up table comprises data relating to the illuminance of said lighting device at a certain distance. Preferably, the look-up table comprises data relating to the illuminance of said lighting device for a certain class of subject—for example wherein the class of subject comprises skin tone.

Preferably the look-up table comprises data relating to settings of said lighting device producing a particular illuminance.

Preferably the lighting device comprises multiple lighting units adapted to be controlled together.

Preferably the step of receiving data relating to settings on a camera comprises receiving data wirelessly.

Preferably the step of receiving data relating to settings on a camera comprises prompting a user for input on a user interface associated with said lighting device.

Preferably the controlling is for a lighting system for videography, broadcast, cinematography, studio filming and/or location filming.

According to another aspect of the present invention there is provided an apparatus for controlling a lighting system, the apparatus comprising: means for receiving data relating to settings on a camera; means for controlling the illuminance of the at least one lighting device in dependence on said data; and preferably means for calibrating the illuminance based on a known illuminance value for a known distance for said lighting device.

Preferably, said means for receiving data relating to settings on a camera comprises a user interface.

Preferably, said means for receiving data relating to settings on a camera comprises a wireless receiver unit.

Preferably, the apparatus is further adapted to carry out the method as described herein.

According to another aspect of the present invention there is provided a computer program product comprising software code adapted to carry out the method as described herein.

According to another aspect of the present invention there is provided a lighting device incorporating the apparatus as described herein.

According to another aspect of the present invention there is provided a system incorporating the apparatus for controlling a lighting system as described herein, and one or more lighting units.

Preferably, the system further comprises a mobile device adapted to send said data relating to settings on a camera to said apparatus for controlling a lighting system.

The invention extends to any novel aspects or features described and/or illustrated herein.

Further features of the invention are characterised by the other independent and dependent claims Any feature in one aspect of the invention may be applied to other aspects of the invention, in any appropriate combination. In particular, method aspects may be applied to apparatus aspects, and vice versa.

Furthermore, features implemented in hardware may be implemented in software, and vice versa. Any reference to software and hardware features herein should be construed accordingly.

Any apparatus feature as described herein may also be provided as a method feature, and vice versa. As used herein, means plus function features may be expressed alternatively in terms of their corresponding structure, such as a suitably programmed processor and associated memory.

It should also be appreciated that particular combinations of the various features described and defined in any aspects of the invention can be implemented and/or supplied and/or used independently.

The invention also provides a computer program and a computer program product comprising software code adapted, when executed on a data processing apparatus, to perform any of the methods described herein, including any or all of their component steps.

The invention also provides a computer program and a computer program product comprising software code which, when executed on a data processing apparatus, comprises any of the apparatus features described herein.

The invention also provides a computer program and a computer program product having an operating system which supports a computer program for carrying out any of the methods described herein and/or for embodying any of the apparatus features described herein.

The invention also provides a computer readable medium having stored thereon the computer program as aforesaid.

The invention also provides a signal carrying the computer program as aforesaid, and a method of transmitting such a signal.

The invention extends to methods and/or apparatus substantially as herein described with reference to the accompanying drawings.

BRIEF DESCRIPTION OF THE SEVERAL VIEWS OF THE DRAWINGS

The invention will now be described by way of example, with references to the accompanying drawings in which.

DESCRIPTION OF SPECIFIC EMBODIMENTS OF THE INVENTION

In the present description the term 'subject' may be understood to mean an object, item, or scene which is to be photographed or filmed. The term 'camera' may be understood to mean a camera operable to record still photographs (such as a digital camera, or 'film' camera) or a video camera operable to record moving images. The lighting system may therefore be for a lighting system for photography, videography, broadcast, cinematography, studio filming and/or location filming.

Figure 1:
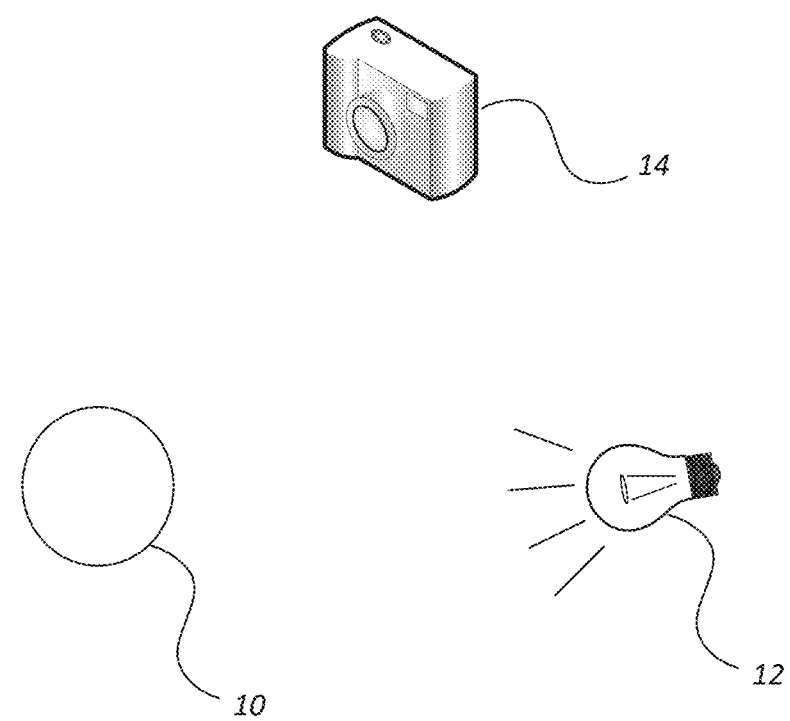
FIG. 1 shows a subject being illuminated by a lighting device and photographed by a camera.

FIG. 1 shows a subject 10 being illuminated by a lighting device 12 and photographed by camera 14. The illuminance incident on the subject 10 to be photographed (and the subsequent luminance being detected by a camera 14) has an effect on the resulting image produced by the camera 14. Trained photographers may adjust the settings on the camera 14 accordingly, or alternatively (when the subject or object is artificially lit) the settings of the lighting device 12 may be adjusted. This may be achieved by dimming or undimming the lighting device 12 (e.g. by increasing or decreasing the current or voltage, by adding/removing neutral density (ND) filters in front of the lighting device) or by increasing or decreasing the distance between a lighting device 12 and the subject 10 (or a combination of such factors). Such adjustment is a non-straightforward process relying on trial and error until satisfactory conditions are achieved. Furthermore, in order to determine whether the conditions are indeed satisfactory, light measurement readings with a luxmeter or luminance meter, or taking and reviewing test images, is required after each adjustment, and each such metered light reading interrupts the session and may require further adjustments to the camera or lighting.

A method and system described herein relates to an accurately calculated dimming method for a lighting device 12 which calculates and displays aperture, based on the shutter speed and ISO/ASA film speed settings of the camera 14, and the distance of the light 12 from the subject 10, based also on data for the light output, beam angle and subject skin tone contrast. In one example a photographer desires to set the aperture and shutter speed to a given value in order to achieve narrow/wide depth of focus and/or a short/long exposure time. At a given ISO/ASA film speed a certain brightness (in terms of luminance or illuminance) is required on the subject 10 in order to get a well exposed photograph or film, which is achieved by accurately adjusting the brightness of the lighting device 12.

Figure 2A:
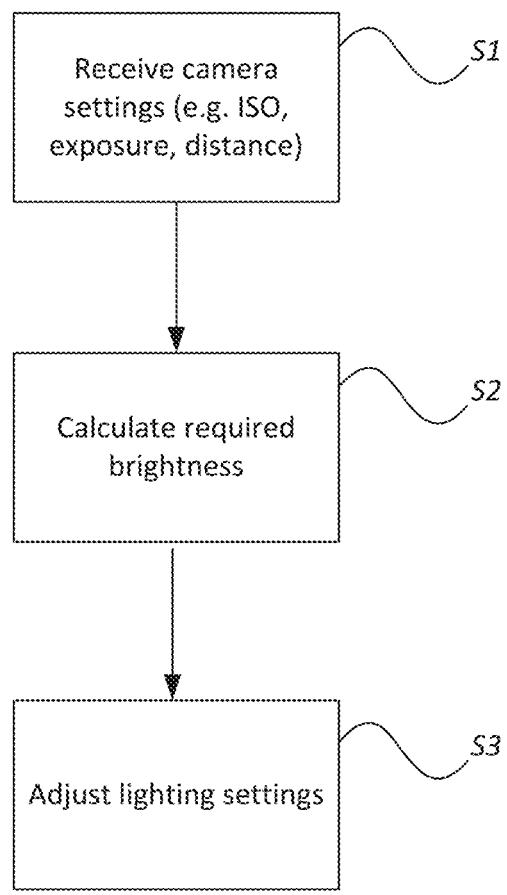
FIG. 2a shows a flow diagram of a method of determining a brightness for the lighting device.

FIG. 2 shows a flow diagram of a method for determining a brightness of a lighting system based on camera exposure settings. The first step (S1) is to receive camera exposure settings. This may be by a user inputting camera settings on a user interface associated with the lighting unit 12 and is described in more detail below with reference to FIG. 3.

The data relating to the camera 14 settings comprise: the shutter speed and ISO/ASA film speed of the camera 14, and the distance from the light 12 to the subject 10.

The distance to the subject may be obtainable from the focus settings of the camera 14. However, such a measurement represents the distance from the subject 10 to the camera 14, and not necessarily the distance from the lighting device 12 to the subject 10. In one example, the distance from the lighting unit 12 to the subject can be approximated from the distance from the camera 14 to subject 10 as lighting units 12 are often positioned immediately behind the camera. If a different set-up is being used a user may be required to measure (or estimate) the distance from the subject 10 to the lighting device 12 and input this distance.

The next step (S2) is to determine the required brightness (in terms of luminance or illuminance) of the lighting device 12 to suit the received camera settings. This may be by the user adjusting the brightness and the system calculating the appropriate aperture size, and the user stopping adjusting when the set aperture size is reached. Alternatively, the user may enter the set camera aperture size and the system determines the required brightness. This calculation of the aperture size or required brightness may be achieved by using the Additive system of Photographic Exposure (APEX) equations (1)-(6) described below.

Calculating the required aperture size or required brightness of the lighting device 12 may require the lighting device 12 being controlled to be calibrated. In one example, this comprises querying a look-up table which calculates the required brightness based on the properties of a lighting unit 12, such as the light output, beam angle and subject skin tone contrast. A further lookup table may convert this into settings (e.g. power) of the lighting device 12 being controlled. Such a calibration may use the calibration equation 7 below.

The lighting settings are then adjusted in step S3 and the subject 10 is lit with the appropriate level of lighting, for example, the power being supplied to the lighting device 12 may be adjusted.

Figure 2B:
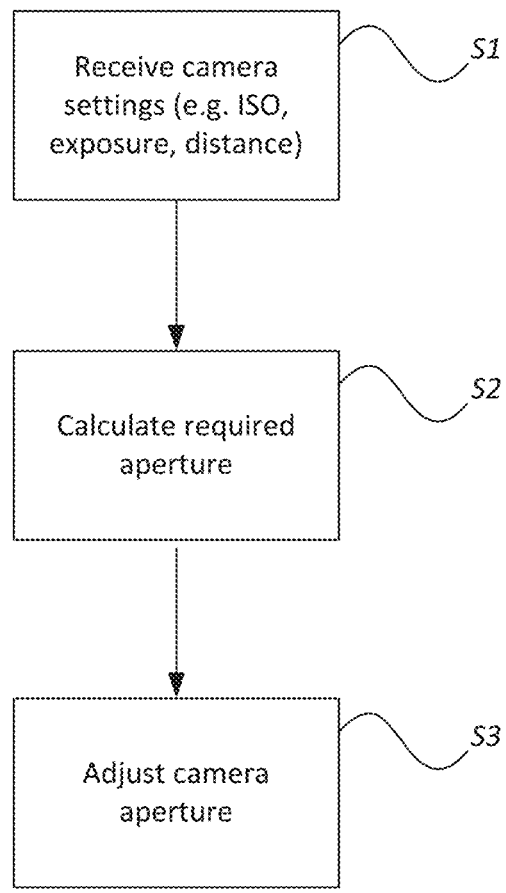
FIG. 2b shows a flow diagram of a method of determining an appropriate camera aperture size.

FIG. 2b shows an analogous method of determining the most suitable aperture for a camera size based on lighting settings. Step S1 is the same as in FIG. 2a, in that the lighting control unit receives exposure data relating to a camera.

In step S2, the required aperture of the light is determined. In one example, as the user adjusts the brightness of the lighting unit 12, the most suitable aperture value is displayed. The aperture is determined based on knowledge of the camera exposure settings (equations 1-6 below), and the brightness of the lighting unit 12 at a particular distance from a subject 10 (equation 7 below). The brightness of the lighting unit 12 may be determined based on known power settings and a look-up table is used to determine the brightness of the lighting device 12 under such conditions.

The user than adjusts the camera aperture in step S3 to the displayed value and can proceed to taking photographs.

During a photoshoot, a photographer may move between different locations and/or use different camera exposure settings. Particular settings may be 'bookmarked' by the photographer so as to enable simple switching between settings.

Equations (1)-(6) below outline a process of determining a desired brightness (E) based on certain camera settings, as per step S2 of FIG. 2, or determining a required aperture for a given brightness.

Equation 1 represents the Additive system of Photographic Exposure (APEX):

$$E_v = A_v + T_v = B_v + S_v \quad (1)$$

$E_v$=exposure value
$A_v$=aperture value
$T_v$=time value
$B_v$=brightness value
$S_v$=speed value Equation 2 is the formula for the aperture value:

$$A_v = 2 * \log_2(N) \quad (2)$$

Where N is the f-stop value of a camera, e.g. 1.1, 2.0, 2.8, 3.5.

Equation 3 is the formula for the time value:

$$T_v = \log_2\left(\frac{1}{t}\right) \quad (3)$$

Where t is the exposure time in seconds, e.g. 1/60, 1/125.

Equation 4 is the formula for the brightness value:

$$B_v = I_v = \log_2\left(\frac{E}{C}\right) \quad (4)$$

Where E is the illuminance in lux, C a calibration constant of a camera depending on manufacturer, a common value is 224.

Equation 5 is the formula for the speed value:

$$S_v = \log_2\left(\frac{S}{3.125}\right) \quad (5)$$

S is the ISO speed value, e.g. 100, 200, 400.

Equation 6 is the formula to determine the required illuminance at the target:

$$E = N^2\left(\frac{C}{t*S}\right) \quad (6)$$

Where E is the average required incident illuminance in lux at target for an 18% grey card. This equation relates aperture size to illuminance based on exposure settings of a camera. However, further information is required to determine how a particular light would produce such illuminance.

Equation 7 is a formula for the calibration of a light device 12, as per step S3 of FIG. 2:

$$E(r) = K * \left(\frac{R}{r}\right)^2 \quad (7)$$

Where E(r) is the illuminance of a particular lighting device at distance r based on a known illuminance value K at distance R. This final equation thus allows the determination of the illuminance of a particular lighting unit 12 required to illuminate an subject 10 at a given distance for a given camera aperture size, or conversely, the required camera aperture size of a camera 14 photographing a subject 10 at a given distance by a particular lighting unit 12 illuminating the subject 10.

In one example, a look-up table is queried so as to find values for a particular lighting device 12. The corresponding values for K and R are then used in calibrating the lighting device 12 so as to determine the required output illuminance to illuminate the subject 10 with the required illuminance E (from equation 6). K and R may be determined empirically so as to accurately replicate the actual functioning of the lighting unit 12 in question. Furthermore, these values may vary depending on the type of subject 10 being illuminated. For example, the user may input the skin tone of the subject and this affects the values of K and/or R based on determined (empirically or calculated) luminance received at a camera under such conditions. In one example, the type of subject being illuminated may be determined from a filter setting of the camera.

A further look-up table may then be queried so as to determine the lighting device settings (e.g. power, number of individual lighting elements to be turned on) which would produce the required output illuminance. This may take the form of a look-up table for values of K corresponding to different lighting device settings.

The lighting device 12 in one example comprises an array of LEDs, potentially consisting of multiple colours. The array may be a panel, flood light, a cluster or any other arrangement of LEDs. This provides the ability for the lighting to produce light of a desired brightness and colour by varying the relative intensities of the different LEDs. The lighting device 12 may alternatively be a filament (incandescent), halogen or other type of lighting.

FIG. 3 shows a series of example user interface screens for receiving the camera settings, as per step S1 of FIG. 1.

FIGS. 3a-d show a user interface 20 associated with a lighting device 12, which may be positioned on the reverse of the lighting device 12 or as a stand-alone device which communicates with the lighting unit 12. The user interface 20 comprises a screen 22 and rotatable and depressible button 24. In use, a user is prompted in turn to input different settings associated with the camera 14. The user adjusts the values in the screen 22 by rotating the button 24, and presses the button 24 to select the value. The user interface 20 then prompts the user to input the next setting value, and the process continues until all required values have been input.

Figure 3C:
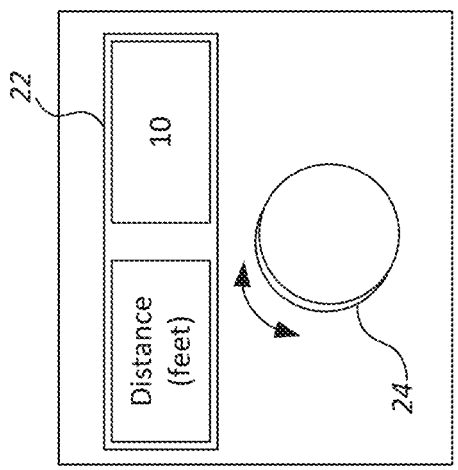
FIGS. 3a, 3b, 3c and 3d show various views of an example user interface for inputting camera settings.
Figure 3B:
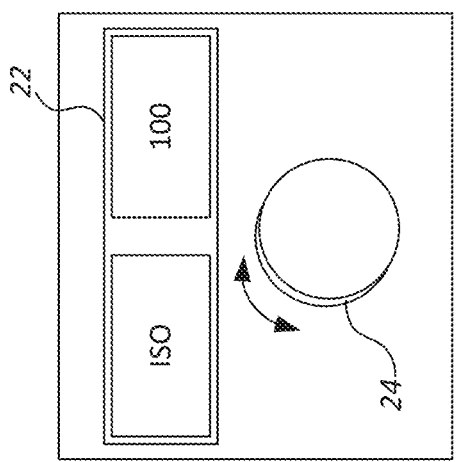

FIG. 3c shows the input of 'Distance (feet)'; this may alternatively be 'Focus depth' as described above.

Figure 3D:
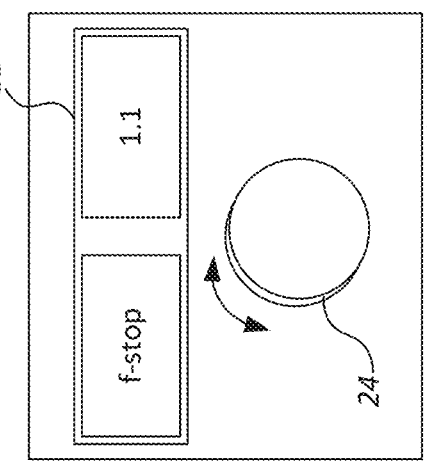
Figure 3A:
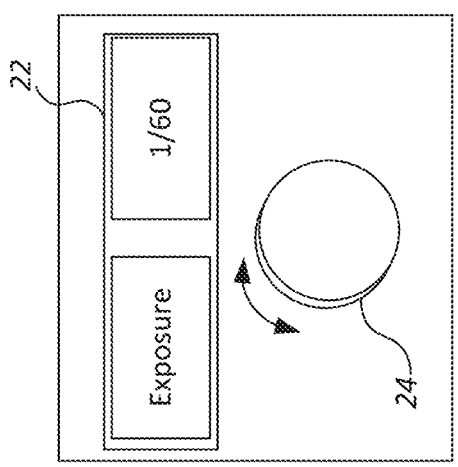

FIG. 3d shows the user interface displaying the 'f-stop' value; as the brightness of the light is adjusted, this value changes corresponding to the appropriate camera aperture value. Alternatively, the user may adjust this value to set the aperture value, and in doing so adjusting the brightness of the lighting unit 12.

The user may also be able to modify the 'Calibration constant'; the user interface 20 may not automatically prompt the user to adjust this value, instead the user may need to access this screen in an alternative way (for example, by accessing a more detailed settings interface).

Figure 4:
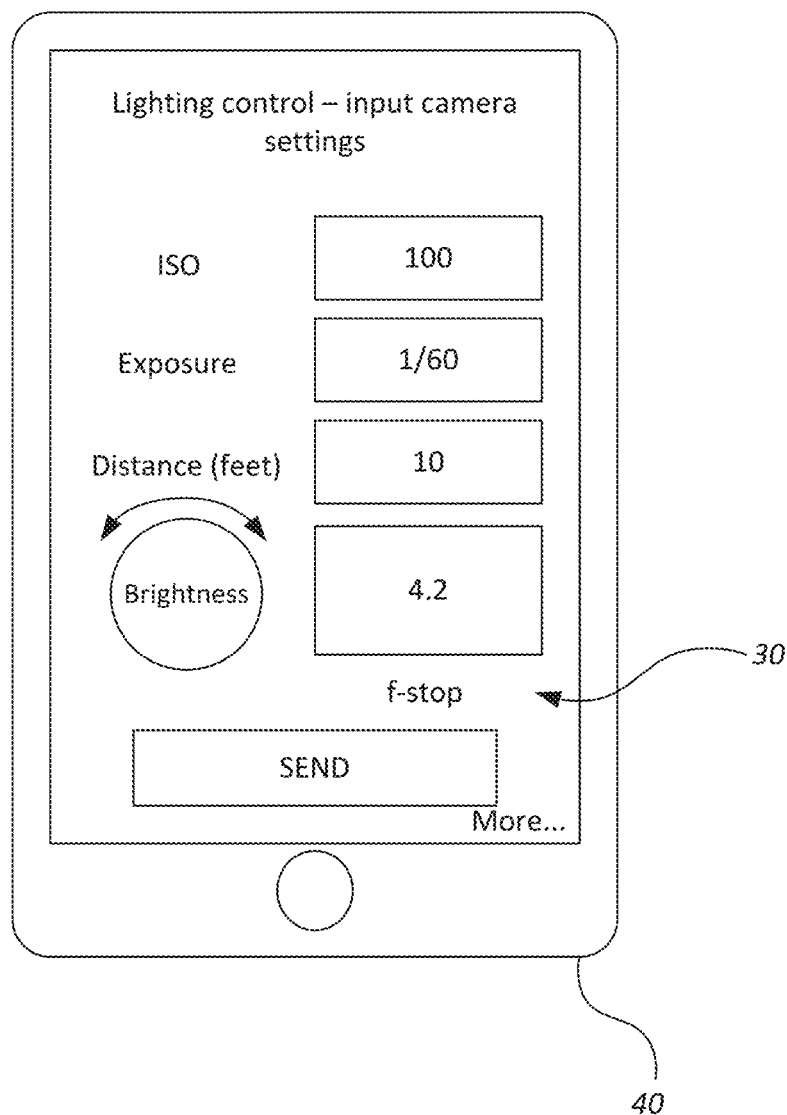
FIG. 4 shows a further example user interface for inputting camera settings.
Figure 5:
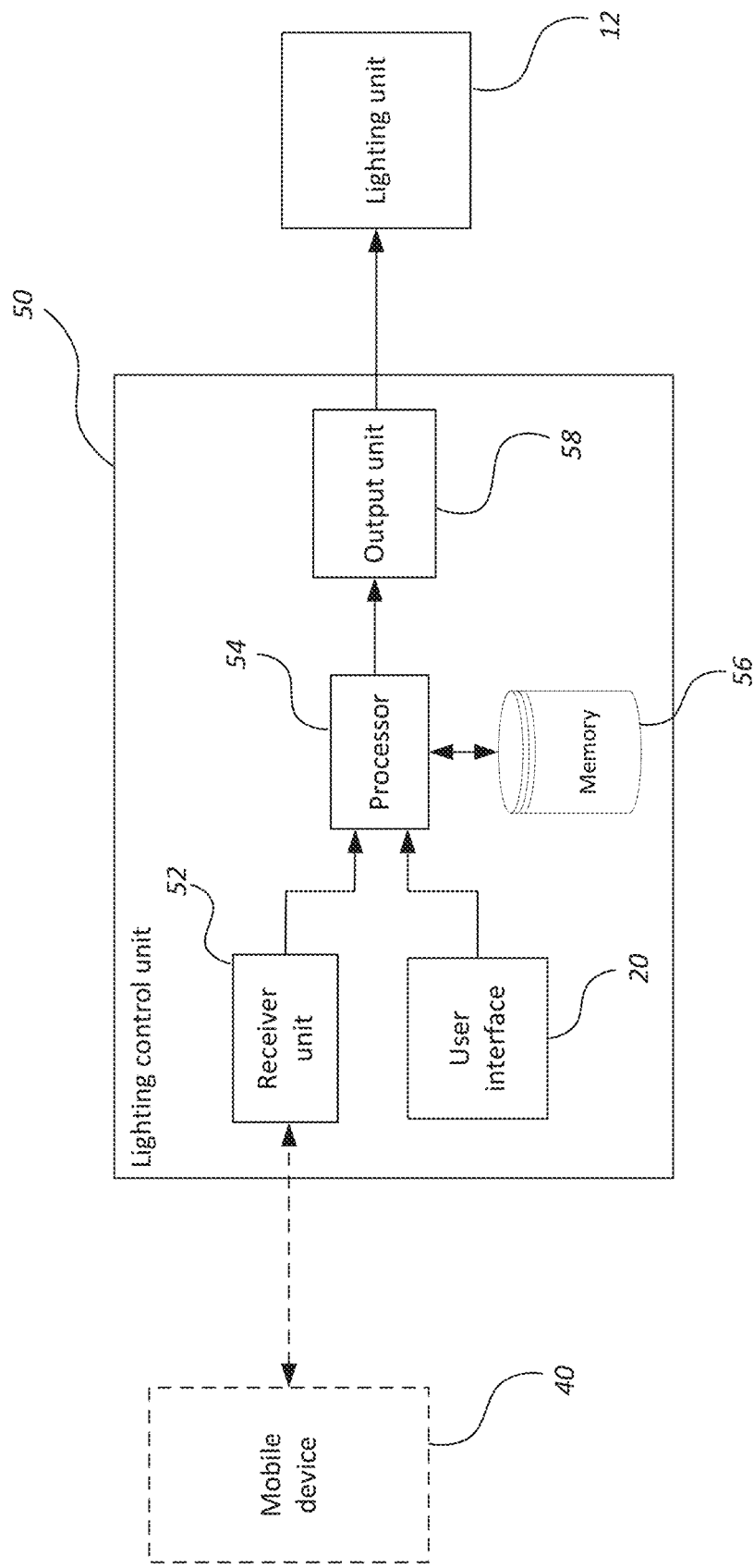
FIG. 5 is a schematic diagram of a lighting system.

FIG. 4 shows an alternative user interface 30 on a mobile device 40. A user may adjust the various settings in a similar way, by either adjusting the brightness of the light (which automatically displays the appropriate aperture size) or entering the aperture size and pressing 'SEND' when the settings are as desired. The settings are then sent wirelessly to a receiver unit 52 (as shown in FIG. 5) associated with a lighting device 12. In one example, the settings are processed on the mobile device 40, and the processed settings are sent to the lighting device 12 (for example, as required lighting device 12 settings as opposed to camera 14 settings).

FIG. 5 shows a schematic diagram of components of a lighting system adapted to carry out the process of FIG. 2. The system comprises a lighting control unit 50 which controls a lighting unit 12, and optionally a mobile device 40 as described above with reference to FIG. 4. The lighting control unit 50 comprises a user interface 20 and/or receiver unit 52, a processor 54 and associated memory 56 and an output unit 58. The lighting control unit 50 may be associated with a lighting unit 12 by way of being positioned on the reverse of the lighting unit 12, or indeed may form part of the lighting unit 12. Alternatively, the lighting control unit 50 may be a stand-alone device which communicates with the lighting unit 12.

In use, data relating to settings on the camera 14 are provided to the processor 54 by the receiver unit 52 or user interface 20. The processor 54, along with the associated memory 56 then processes the settings so as to determine a required brightness. The memory 56 may comprise look-up tables for calibrating the lighting device 12, or such values may be hard-coded into the lighting control unit 50. The required brightness is then sent to the output unit which determines the necessary electrical signals for the lighting unit 12 to produce the required illumination.

The receiver unit 52 comprises an antenna and is operable to receive data from the mobile device 40. This may be via WiFi®, Zigbee® radio, Bluetooth®, Near Field Communication (NFC) or via a mobile communication network utilising protocols such as GSM (Groupe Special Mobile) 3GPP ($3^{rd}$ Generation Partnership), or 4G LTE (Long term evolution). The lighting control unit 50 may further comprise a transmitter unit (not shown) so as to report back to the mobile device 40 the current settings and/or diagnostic information relating to data transmission.

It should be appreciated that the components illustrated in FIG. 5 may be split into further components, or combined together. For example, the output unit 58 may be part of the processor 54.

ALTERNATIVES AND MODIFICATIONS

Various other modifications will be apparent to those skilled in the art for example multiple lighting units may be controlled simultaneously. In one example, multiple lighting units may be connected to one-another (for example, in an array) and a single user interface is used to input the camera settings. The values 'R' and/or 'K' defining the characteristics of the lighting device 12 may be modified accordingly to calibrate the group of lighting units simultaneously.

The distance from the lighting device 12 to the subject 10 may be measured by illuminating the subject 10 with a distance measuring light beam such as LiDAR (Light Radar) or a laser distance measuring device, optionally from a device associated with the lighting device 12 itself. In such a way, the distance from the lighting device 12 to the subject 10 is automatically calculated and the lighting settings can be automatically adjusted as the lighting device 12 and/or subject 10 moves, without further user intervention. In one example, the distance measuring light beam is in the visible spectrum (e.g. red) so that a photographer can aim it at the subject 10. In such an example, the distance measuring light beam is turned off once the distance has been measured so that it does not appear in a photograph. In another example, the distance measuring light beam is in the non-visible spectrum (e.g. infra-red) so that it does not appear on a photograph. In such an example, the distance measuring light beam can be on the whole time without affecting the photograph. Such a method of measuring the distance to the subject may be used instead of, or in conjunction with, receiving data relating to the focus of a camera.

The data relating to camera settings may be sent directly from the camera 14, for example if the camera is connected (either wired or wirelessly) to the lighting device. Similarly, the appropriate aperture size may be sent directly to the camera 14 and the size adjusted accordingly.

It should be appreciated that although the above description primarily relates to photographs, the same apparatus, system and method may be applied to recording moving images.

It will be understood that the present invention has been described above purely by way of example, and modifications of detail can be made within the scope of the invention.

Reference numerals appearing in the claims are by way of illustration only and shall have no limiting effect on the scope of the claims.

What is claimed is:

1. A method for controlling a lighting device illuminating the subject of a photograph or film, the method comprising:
   receiving, at a user interface of the lighting device, user input of data relating to settings on a camera;
   determining the distance between the lighting device and the subject;
   determining, by the lighting device, an illuminance for at least one lighting device, wherein said determining comprises calibrating the illuminance based on a known illuminance value for a known distance between said lighting device and the subject; and
   determining, by the lighting device, an appropriate camera aperture in dependence on said: determined distance; determined illuminance; and camera settings;
   whereby modification of the illuminance of the lighting device by a user modifies the determined appropriate camera aperture.

2. The method according to claim 1, wherein the data relating to settings on a camera comprises exposure settings.

3. The method according to claim 1, wherein determining a distance to a subject comprises receiving data relating to the focus of a camera.

4. The method according to claim 1, wherein determining a distance to a subject comprises illuminating the subject with a distance measuring light beam.

5. The method according to claim 1, wherein said calibrating comprises querying a look-up table relating to said lighting device.

6. The method according to claim 5, wherein the look-up table comprises data relating to the illuminance of said lighting device at a certain distance.

7. The method according to claim 5, wherein the look-up table comprises data relating to the illuminance of said lighting device for a certain class of subject; preferably wherein the class of subject comprises skin tone.

8. The method according to claim 5, wherein the look-up table comprises data relating to settings of said lighting device producing a particular illuminance.

9. The method according to claim 1, wherein said lighting device comprises multiple lighting units adapted to be controlled together.

10. The method according to claim 1, wherein the step of receiving data relating to settings on a camera comprises prompting a user for input on a user interface associated with said lighting device.

11. The method according to claim 1, wherein the controlling is for a lighting system for videography, broadcast, cinematography, studio filming and/or location filming.

12. A lighting device comprising:
    a user interface for receiving user input of data relating to settings on a camera;
    a processor adapted for:
    determining the distance between the lighting device and a subject;
    determining the illuminance of the lighting device, the illuminance being calibrated by the processor based on a known illuminance value for a known distance between said lighting device and the subject, and
    determining in use an appropriate camera aperture in dependence on said: determined distance; determined illuminance; and data relating to settings on the camera; and
    a user input device for modifying in use the illuminance of the at least one lighting device, whereby modifying the illuminance modifies in use the determined appropriate camera aperture.

13. The system comprising the lighting device according to claim 12 and one or more cameras.

14. The method according to claim 1, wherein determining the distance between the lighting device and the subject comprises a user inputting the distance at the user interface of the lighting device.

15. The lighting device according to claim 12, wherein determining the distance between the lighting device and the subject comprises receiving a user input of the distance at the user interface of the lighting device.

* * * * *